US008687538B2

(12) United States Patent
Sébire et al.

(10) Patent No.: US 8,687,538 B2
(45) Date of Patent: Apr. 1, 2014

(54) ARRANGEMENTS FOR CONTROLLING MOBILITY IN A NETWORK SHARING ENVIRONMENT

(71) Applicant: Renesas Mobile Corporation, Tokyo (JP)

(72) Inventors: Guillaume Sébire, Espoo (FI); David Navrátil, Helsinki (FI); Harri Jokinen, Pertteli (FI); Jijo Mathew Kummumpuzha, Bangalore (IN); Vlora Rexhepi-Van Der Pol, ML Den Hoorn (NL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/872,817

(22) Filed: Apr. 29, 2013

(65) Prior Publication Data

US 2013/0235785 A1 Sep. 12, 2013

Related U.S. Application Data

(63) Continuation of application No. PCT/IB2011/003120, filed on Dec. 22, 2011.

(30) Foreign Application Priority Data

Oct. 17, 2011 (IN) .......................... 2903/MUM/2011

(51) Int. Cl.
*H04H 20/71* (2008.01)
(52) U.S. Cl.
USPC .............................................. 370/312; 726/7
(58) Field of Classification Search
USPC .............................................. 370/312; 726/7
See application file for complete search history.

(56) References Cited

U.S. PATENT DOCUMENTS 8,447,284 B1 * 5/2013 Lee et al. .................... 455/414.3
2001/0018326 A1 * 8/2001 Link, II ........................ 455/3.05

(Continued)

FOREIGN PATENT DOCUMENTS

EP   1 686 827 A1   8/2006
EP   2 421 302 A2   2/2012

(Continued)

OTHER PUBLICATIONS

European Telecommunications Standards Institute (ETSI), Universal Mobile Telecommunications System; LTE; Network Sharing; Architecture and functional description (3 GPP TS 23.251 ver. 10.2.0 release 10), Technical Specification, Sophia-Antipolis Cedex, France, Jun. 1, 2011, XP014065845 (29 pages).

(Continued)

*Primary Examiner* — Wei Zhao
(74) *Attorney, Agent, or Firm* — Lucas & Mercanti LLP; Robert P. Michal

(57) ABSTRACT

There is provided arrangements for controlling and supporting network sharing. A set of common system information which applies to communication networks sharing at least one shared local communication area for communicating with host network elements is prepared. A set of dedicated system information which applies to at least one of the communication networks sharing the at least one shared local communication area is prepared. The dedicated system information is addressed only to host network elements being configured to support sharing of a local communication area. System information including the set of common system information and the set of dedicated system information is transmitted. The common system information includes an information element indicating radio frequency channels used by neighboring local communication areas of the communication networks that share the at least one shared local communication area, said neighboring local communication areas neighboring the at least one shared local communication area.

21 Claims, 7 Drawing Sheets

(56) References Cited

U.S. PATENT DOCUMENTS

2008/0279204 A1* 11/2008 Pratt et al. .................. 370/406
2009/0047957 A1   2/2009 Westerberg et al.

FOREIGN PATENT DOCUMENTS

WO    WO 2005/039197 A2   4/2005
WO    WO 2006/101426 A1   9/2006

OTHER PUBLICATIONS

Renesas Mobile Europe Ltd., "Mobility Aspects and Full MOCN," 3GPP Draft, GP-111248, Sophia-Antipolis Cedex, France, Aug. 25, 2011, XP050536869 (3 pages).

Renesas Mobile Europe Ltd., "Full MOCN and Mobility" 3GPP Draft, GP-111689, Sophia-Antipolis Cedex, France, Nov. 16, 2011, XP050560907 (6 pages).

PCT International Search Report and Written Opinion mailed Aug. 21, 2012 issued in a related PCT Application No. PCT/IB2011/003120 filed Dec. 22, 2011 (19 pages).

UKIPO Combined Search and Examination Report under Sections 17 and 18(3) dated Oct. 22, 2012 which is issued in a related UK Application GB1218001.4 (7 page).

UKIPO Combined Search and Examination Report under Sections 17 and 18(3) dated Jan. 8, 2013 which is issued in a related UK Application No. GB1218001.4 (2 page).

UKIPO Combined Search and Examination Report under Sections 17 and 18(3) dated Mar. 15, 2013 which is issued in a related UK Application No. GB1301580.5 (7 page).

* cited by examiner

ARRANGEMENTS FOR CONTROLLING MOBILITY IN A NETWORK SHARING ENVIRONMENT

CROSS REFERENCE TO RELATED APPLICATIONS

This application is a Continuation application of PCT International Application No. PCT/IB2011/003120 filed Dec. 22, 2011, which claims the benefit of foreign priority to Indian Application No. 2903/MUM/2011 filed Oct. 17, 2011, UK Patent Application No. 1218001.4 filed on Oct. 8, 2012 and its Divisional Application No. 1301580.5 filed Jan. 29, 2013 being related to the PCT Application and the Indian Application and claiming priority of each of the Indian and PCT Applications, the entire content of each of which is incorporated herein by reference.

TECHNICAL FIELD

The present invention relates to apparatus and methods that provide for controlling and supporting mobility of host network elements in a communication environment where network sharing is employed. In particular examples, the present invention relates to apparatus, methods, and computer program products providing a mechanism supporting and controlling mobility procedures in an environment where communication resources, such as access network resources of one or more local communication areas or cells, are shared by plural different communication networks or PLMNs, for example according to a MOCN (Multiple Operator Core Network) or Full MOCN principle.

BACKGROUND

Prior art that is related to this technical field can be found in, for example, the technical specification 3GPP TS 23.251, the technical specification 3GPP TS 44.018, the technical specification 3GPP TS 45.008, the technical specification 3GPP TS 43.003, and the technical specification 3GPP TS 45.005.

The following meanings for the abbreviations used in this specification apply:
 ARFCN absolute radio frequency channel number
 BA BCCH allocation
 BCCH broadcast control channel
 BS base station
 BSC base station controller
 BSIC base station identity code
 GERAN GSM EDGE radio access network
 GPRS General Packet Radio Service
 GSM Global System for Mobile Communication
 EDGE Enhanced Data Rate for GSM Evolution
 eNB evolved NodeB
 ePLMN equivalent PLMN
 ID identification
 HLR home location register
 LAC location area code
 LAI location area identification
 LTE Long Term Evolution
 LTE-A LTE Advanced
 MCC mobile country code
 MNC mobile network code
 MOCN multiple operator core network
 MSG mobile switching centre
 NCC network colour code
 NCL neighbour cell list
 PACCH packet associated control channel
 PBCCH packet broadcast control channel
 PLMN public land mobile network
 RNC radio network controller
 SACCH slow associated control channel
 SCH synchronisation channel
 SGSN serving GPRS support node
 SI system information
 SIx system information type x message
 UE user equipment In the last few years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organisations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments. Examples for new communication technologies are for example LTE and LTE-A of 3GPP.

Network sharing is a way for operators to share the heavy deployment costs for mobile networks, e.g. in the roll-out phase. In the current mobile telephony marketplace, functionality that enables various forms of network sharing is becoming more and more important.

A network sharing architecture allows different core network operators to connect to a shared radio access network. The operators do not only share the radio network elements, but may also share the radio resources themselves.

One example for such a network sharing architecture is the MOCN approach (or Full MOCN) which is applicable to different communication network types, for example GERAN. In the MOCN approach, a network-sharing configuration is provided where only the radio access network, is shared while the core networks are separated according to the sharing communication networks, such as different PLMNs.

In the MOCN approach, it is proposed to rely both on the use of a common ID for the communication network, such as a common PLMN-ID broadcast in the cells that are shared between different communication networks, and on the routing of all data and signalling to/from a given host network element (mobile station or UE) from/to the appropriate operator core network by the BSC(s) controlling these cells. Unlike Full MOCN, MOCN is defined such that it enables the use of network sharing with host network elements such as mobile stations that do not support Full MOCN and also host network elements that do support Full MOCN. In other words, MOCN allows operators to use network sharing with legacy host network elements (which do not support Full MOCN) and supporting host network elements (which do support Full MOCN) wherein these host network elements use the common PLMN ID e.g. in PLMN (re)selection procedures. It may be noted that with MOCN, a mobile station or other host network element in a cell shared by MOCN does not know whether or not this cell is shared: the list of PLMNs sharing the cell is not sent by such network on the radio interface and is thus not visible to this mobile. On the other hand, in Full MOCN, new information is transmitted on the radio interface, specifically as a minimum the list of PLMNs sharing the cell. This information can only be acquired by a mobile station or other UE that can receive and understand it, i.e. a mobile station or UE that supports Full MOCN, referred to herein as a "supporting" UE, host network element, or mobile station or the like. The supporting UE can itself select a PLMN in this list, and the network will route the registration to the indicated selected PLMN. Thus, with this terminology, MOCN works with both supporting and non-supporting UEs or other devices, whereas Full MOCN only works with supporting UEs or other devices.

However, in network sharing environments such as MOCN, a problem may arise with regard to mobility of host network elements such as UEs when multiple operators are sharing the same access network. For example, when a local communication area or cell is shared between several PLMNs it has to be ensured that mobility procedures are possible between this cell and neighbouring cells of these PLMNs.

That is, besides a PLMN (re)selection procedure, a suitable mechanism and control for mobility between shared cells and non-shared cells has to be provided.

SUMMARY

According to a first aspect of the present invention, there is provided apparatus including a common system information preparation portion configured to prepare a set of common system information which applies to communication networks sharing at least one shared local communication area for communicating with host network elements, a dedicated system information preparation portion configured to prepare a set of dedicated system information which applies to at least one of the communication networks sharing the at least one shared local communication area, wherein the dedicated system information is addressed, only to host network elements being configured to support sharing of a local communication area, and a transmitting portion configured to send to host network elements being located in a shared local communication area system information including the set of common system information and the set of dedicated system information, wherein the common system information includes an information element, indicating radio frequency channels used by neighbouring local communication areas of the communication networks that share the at least one shared local communication area, said neighbouring local communication areas neighbouring the at least one shared local communication area.

According to a second aspect of the present invention, there is provided a method including preparing a set of common system information which applies to communication networks sharing at least one shared local communication area for communicating with host network elements, preparing a set of dedicated system information which applies to at least one of the communication networks sharing the at least one shared local communication area, wherein the dedicated system information is addressed only to host network elements being configured to support, sharing of a local communication area, and transmitting to host, network elements being located in a shared local communication area system information including the set of common system information and the set of dedicated system information, wherein the common system information includes an information element indicating radio frequency channels used by all neighbouring local communication areas of the communication networks that share the at least one shared local communication area, said neighbouring local communication areas neighbouring the at least one shared local communication area.

According to a third aspect of the present invention, there is provided apparatus including a system information receiving portion configured to receive system information, the system information including a set of common system information which applies to communication networks sharing at least one shared local communication area for communicating with host network elements, and a set of dedicated system information which applies to at least one of the communication networks sharing the at least one shared local communication area, wherein the dedicated system information is addressed only to host network elements being configured to support sharing of a local communication area, wherein the common system information includes an information element indicating radio frequency channels used by neighbouring local communication areas of the communication networks that share the at least one shared local communication area, said neighbouring local communication areas neighbouring the at least one shared local communication area, and a system information processing portion configured to process at least the set of common system information for one of a reselection procedure, a local communication area measurement procedure and a local communication area measurement and reporting procedure conducted by a host network element.

According to a fourth aspect of the present invention, there is provided a method including receiving system information, the system information including a set of common system information which applies to communication networks sharing at least one shared local communication area for communicating with host network elements, and a set of dedicated system information which applies to at least one of the communication networks sharing the at least one shared local communication area, wherein the dedicated system information is addressed only to host network elements being configured to support sharing of a local communication area, wherein the common system information includes an information element indicating radio frequency channels used by neighbouring local communication areas of the communication networks that share the at least one shared local communication area, said neighbouring local communication areas neighbouring the at least one shared local communication area, and processing at least the set of common system information for one of a reselection procedure, a local communication area measurement procedure and a local communication area measurement and reporting procedure conducted by a host network element.

According to a fifth aspect of the present, invention, there is provided apparatus including a common system information preparation portion configured to prepare a set of common system information which applies to local communication areas of a communication network sharing at least one shared local communication area with other communication areas for communicating with host network elements, a transmitting portion configured to send to host network elements being located in a non-shared local communication area being a neighbouring local communication area to a shared local communication area system information including the set of common system information, wherein the common system information includes an information element indicating radio frequency channels used by the at least one shared local communication area and neighbouring local communication areas of the communication network that share the at least one shared local communication area, said neighbouring local communication areas neighbouring the at least one shared local communication area.

According to a sixth aspect of the present invention, there is provided a method including preparing a set of common system information which applies to local communication areas of a communication network sharing at least one shared local communication area with other communication networks for communicating with host network elements, transmitting to host network elements being located in a non-shared local communication area being a neighbouring local communication area to a shared local communication area system information including the set of common system information, wherein the common system information includes an information element indicating radio frequency channels used by the at least one shared local communication area and neighbouring local communication areas of the communication network that share the at least one shared local communication area, said neighbouring local communication areas neighbouring the at least one shared local communication area.

According to a seventh aspect of the present invention, there is provided a communication network including, at least one shared local communication area whose resources for communication with a host network element are shared with at least one other communication network, and at least one non-shared local communication area being a neighbouring local communication area to the shared local communication area whose resources for communication are not shared, the at least one non-shared local communication area being only used by the communication network, wherein the communication network applies a first network identification element used in the shared local communication area and a second network identification element being different from the first network identification element, wherein the second network identification element is used in the at least one non-shared local communication area.

There is also provided a computer program for a computer, including software code portions for performing the steps of the above defined methods, when run on a computer. The computer program may be stored on or in a computer program product, which may include a computer-readable medium on which said software code portions are stored. Furthermore, the computer program product may be directly loadable into the internal memory of the computer and/or transmittable via a network by means of at least one of upload, download and push procedures.

Examples of embodiments of the present invention provide a mechanism for controlling mobility of host network elements in a communication environment where network sharing is employed. Particular examples provide apparatus, methods, and computer programs that provide a mechanism by means of which mobility in a communication environment employing network sharing is supported while the load for network elements involved in the mobility, such as access or core network elements or host network elements, as well as the corresponding signalling load, are minimised. By virtue of the proposed solutions, it is possible to provide a mechanism by means of which, mobility procedures can be supported adequately between a cell shared between different PLMNs and the neighbouring cells of these PLMNs, while minimising the impact on signalling in these cells. Specifically, in examples, a high processing and signalling load in network elements involved in the mobility procedure can be reduced since for example unnecessary measurement and reporting of cells to which a host network element such as a UE may have no access (because these cells may simply not be in a PLMN to which the UE has access) are avoided. Furthermore, the proposed solution is applicable also in connection with communication environments where host network elements are used that do not support the network sharing.

Further features and advantages of the invention will become apparent from the following description of preferred embodiments of the invention, given by way of example only, which is made with reference to the accompanying drawings.

DETAILED DESCRIPTION

Figure 1:
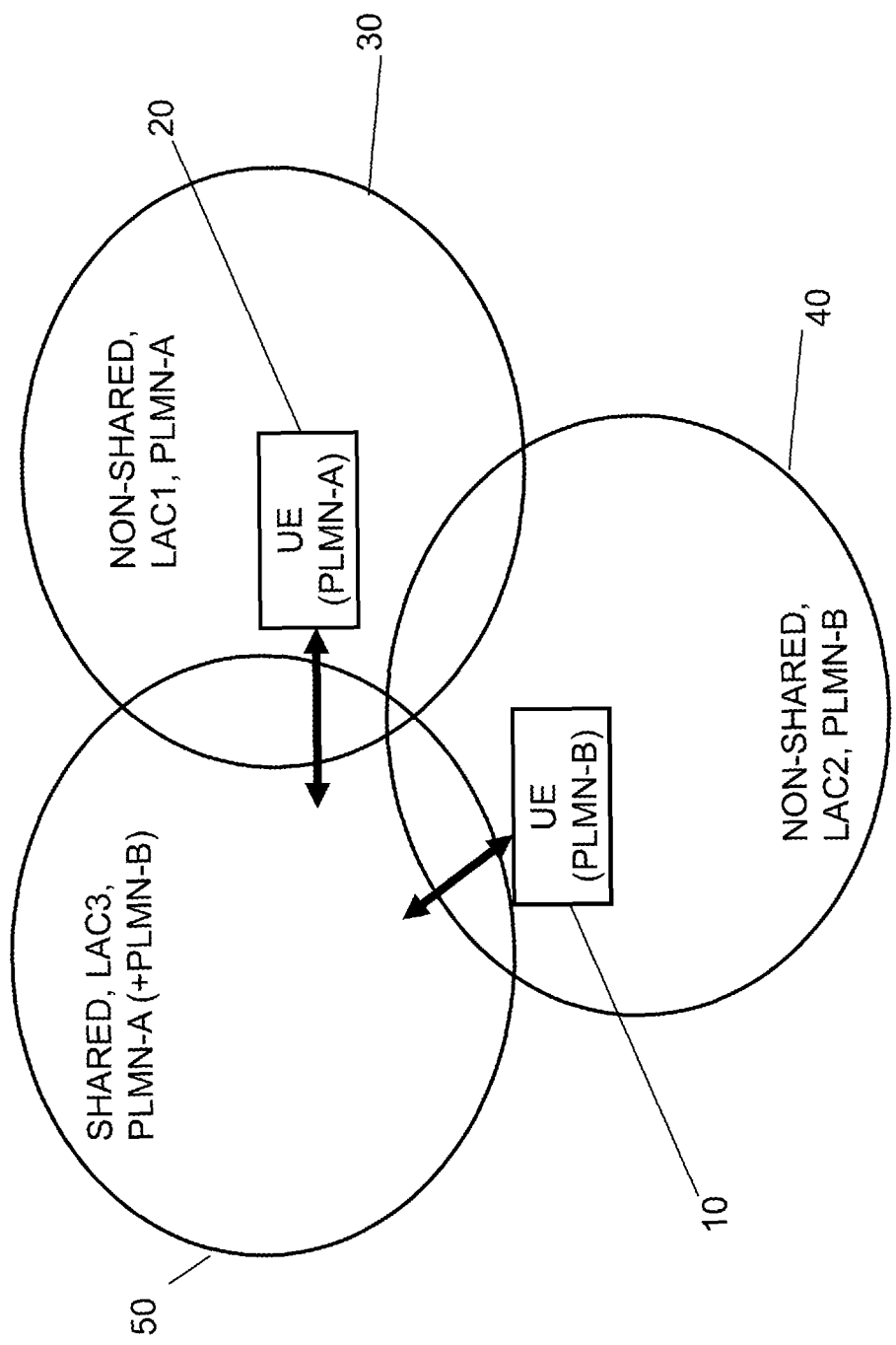
FIG. 1 shows a diagram illustrating schematically a communication network configuration with network sharing in which examples of embodiments of the invention are applicable.

In the following, examples and embodiments of the present invention are described with reference to the drawings. For illustrating the present invention, the examples and embodiments will be described in connection with cellular communication networks based on a 3GPP GERAN as an example of a communication network, wherein network sharing according to MOCN or Full MOCN is employed. However, it is to be noted that the present invention is not limited to an application using such types of communication systems or network sharing approached, but is also applicable in other types of communication systems and the like, for example UTRAN (UMTS terrestrial radio access network) or the like or MORAN (multi-operator radio access network).

A basic system architecture of a communication network may include a commonly known architecture of a communication system including a wired or wireless access network subsystem and a core network. Such an architecture may include one or more network element such as access network control elements, radio access network elements, access service network gateways or base transceiver stations, e.g. base station (BS) or eNB, with which a host, network element or device, such as a UE or another device having a similar function, such as a modem chipset, a chip, a module etc., which can also be part of a UE or attached as a separate element to a UE, or the like, is capable of communicating via one or more channels for transmitting several types of data. Furthermore, core network elements such as gateway network elements, serving nodes, policy and charging control network elements, mobility management entities and the like are usually included.

The general functions and interconnections of the described elements, depending on the actual network type, are known to those skilled in the art and described in corresponding specifications so that a detailed description thereof is omitted herein. However, it is to be noted that several additional network elements and signalling links may be employed for a communication connection to or from UEs or network nodes (access network nodes, core network nodes etc.), besides those described in detail herein below.

Furthermore, the described network elements, such as host network elements like a UE, communication network elements like BSs or eNBs, core network elements like control element and gateway nodes (MSG, RNC etc.) and the like, as well as corresponding functions as described herein, may be implemented by software, e.g. by a computer program product for a computer, and/or by hardware. In any case, for executing their respective functions, correspondingly used devices, nodes or network elements may include several means and components (not shown) which are required for control, processing and communication/signalling functionality. Such means may include, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification, processing portions should not be only considered to represent physical portions of one or more processors, but may also be considered as a logical division of the referred processing tasks performed by one or more processors.

Figure 2:
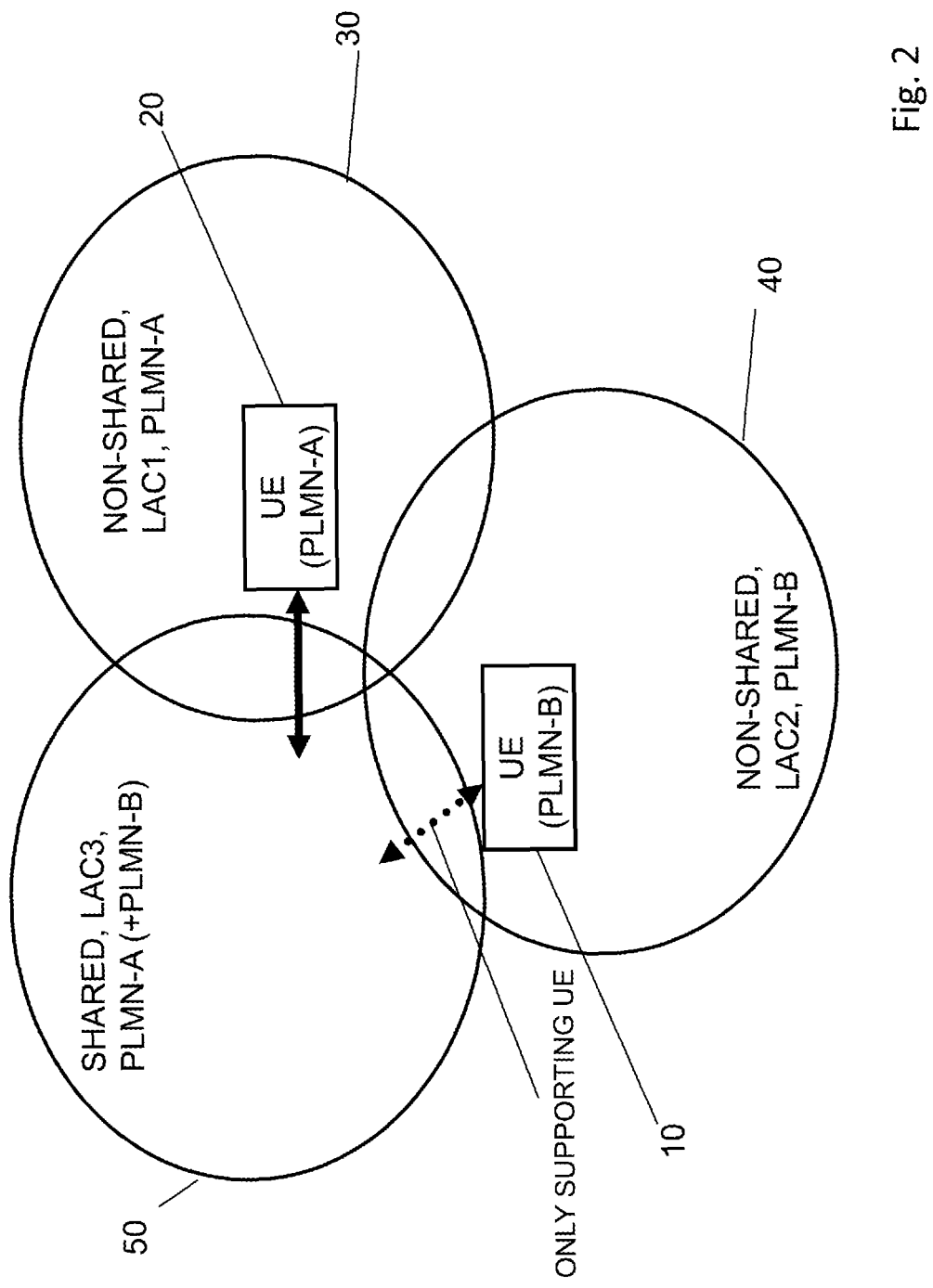
FIG. 2 shows a diagram illustrating schematically another communication network configuration with network sharing in winch examples of embodiments of the invention are applicable.
Figure 3:
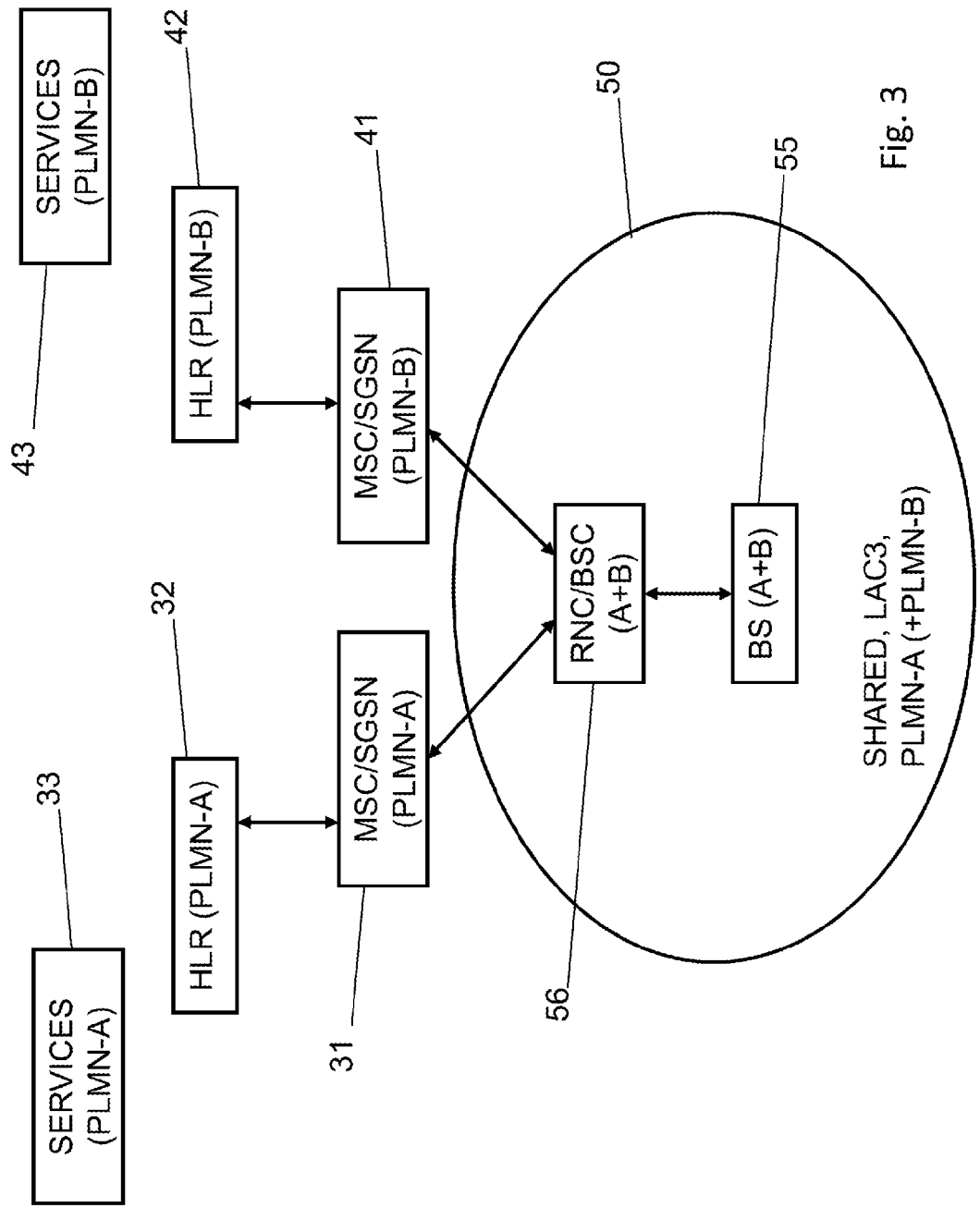
FIG. 3 shows a diagram illustrating schematically an example for a communication network structure on which the communication network configuration according to FIGS. 1 and 2 may be based.

FIG. 1 and FIG. 2 show diagrams illustrating respective communication network configurations with network sharing in which examples of embodiments of the invention are applicable. Specifically, FIG. 1 is related to a network configuration where implementation of MOCN (possibly with Full MOCN) is assumed, while FIG. 2 is related to a network configuration where implementation of Full MOCN is assumed (MOCN not used). FIG. 3 shows a diagram illustrating an example for a communication network structure on which the communication network configuration according to FIGS. 1 and 2 may be based.

In the following, a communication network means for example a PLMN consisting of radio access network and core network, by winch normally only one serving operator provides services to its subscriber. Subscribers of other operators may receive services by national or international roaming. It is to be noted that in the network sharing environment assumed in examples of embodiments of the invention, operators provide services to subscribers as one of multiple serving operators that share at least one radio access network with other operators (PLMNs).

Furthermore, a common PLMN-ID means a common general identification element or PLMN-ID (PLMN-ID is used as one example for a general identification element of a communication network) which is indicated in system information like the system broadcast information as defined for conventional networks, which non-supporting host network elements or UEs understand as the serving operator. Such a non-supporting host network element or UE is e.g. a UE that does not support network sharing in the sense that it ignores the additional broadcast system information that is specific for network sharing, for example according to Full MOCN principles. On the other hand, a supporting host network element or UE means e.g. a UE that supports network sharing, for example according to Full MOCN principles in the sense that it is able to understand dedicated signalling within a shared network.

Basically, as indicated above, network sharing means that a network part, e.g. a local communication area such as a cell, i.e. a part of a radio access network, is shared while other network parts, such as core network parts, are separated between the sharing PLMNs (i.e. each sharing PLMN has its own core network part). This is schematically illustrated by way of example in FIG. 3.

According to FIG. 3, two PLMNs participate in the network sharing. It is to be noted that, the number of networks or PLMNs participating in network sharing is not limited to two but may be three or more.

A first communication network or PLMN-A is represented by a control network element, like an MSC or SGSN 31, a corresponding HLR 32 and service platforms 33. A second communication network or PLMN-B is represented by a control network element like an MSC or SGSN 41, a corresponding HLR 42 and service platforms 43.

The access network controller of the shared cell 50, such as RNC/BSC 56, is connected with the control network elements 31 and 41 of PLMN-A and PLMN-B, respectively. To the RNC/BSC 56, the base station BS 55 covering the cell 50 is connected. In the configuration depicted in FIG. 3, it is assumed that the cell 50 is controlled by the PLMN-A representing the primary PLMN, while PLMN-B represents a non-primary PLMN sharing the shared cell 50. In other words, local communication area or cell 50, with its radio access network control element 56 and its base station 55, may serve subscribers of both PLMN-A and PLMN-B.

In the communication network configurations shown schematically in FIGS. 1 and 2, it is assumed that a structure as described in connection with FIG. 3 is used. Furthermore, the primary PLMN-A, which controls the shared cell 50 having a local area code 3 (LAC3), for example, includes also other non-shared cells of which one cell 30 having a LAC1 is shown. Cell 30 is assumed to be a neighbouring cell to the shared cell 50. Similarly, the non-primary PLMN-B, which shares the shared cell 50 with the PLMN-A, includes also other non-shared cells of which one cell 40 having a LAC2 is shown. Cell 40 is assumed to be a neighbouring cell to the shared cell 50.

As indicated in FIGS. 1 and 2, host network elements such as UEs 10 and 20, which are registered to a respective one of the PLMNs A and B, are located in the local communication areas. Depending on the mode in which the host network element is, different procedures with regard to mobility, i.e. the movement of the host network element within the cells, may apply.

Besides PLMN or cell (re)selection, successful mobility procedure between the shared cell 50 and non-shared cells 30 and 40 for the respective host network element includes that movement between the cells is allowed or prevented.

For example, in the scenario according to FIG. 1, where a MOCN configuration (or possibly Full MOCN on top of MOCN) is assumed, successful mobility (indicated by the arrows in the figure) exists for UE 20 which is registered to PLMN-A between non-shared cell 30 and cell 50 which is the shared cell. Similarly, successful mobility exists for UE 10 which is registered to PLMN-B between non-shared cell 40 and cell 50 which is the shared cell. No successful mobility exists for UE 20 registered to PLMN-A to the non-shared cells of PLMN-B (e.g. cell 40) (and vice versa for UE 10 to non-shared cells of PLMN-A).

In the scenario according to FIG. 2, where a Full MOCN configuration (introduced without first introducing MOCN) is assumed, successful mobility (indicated by a solid arrow and a dashed arrow) exists for UE 20 which is registered to PLMN-A between non-shared cell 30 and cell 50 which is the shared cell. On the other hand, successful mobility exists for UE 10 which is registered to PLMN-B between non-shared cell 40 and cell 50 which is the shared cell only in case when the UE 10 is a supporting host network element or UE registered to PLMN-B. No successful mobility exists for UE 20 registered to PLMN-A to the non-shared cells of PLMN-B (e.g. cell 40), for UE 10 to non-shared cells of PLMN-A, and for UE 10 to the shared cell 50 in case UE 10 is a non-supporting UE.

For mobility and/or cell (re-)selection purposes, in communication networks, system information is sent to host network elements being located in a local communication area of the network. For example, in a GERAN cell, GSM neighbour cell information is broadcast to enable mobility between the cell and the neighbouring cells thereof. This information typically applies to all host network elements (mobile stations etc.) in the cell. In order to avoid unnecessary load for host network elements when enabling mobility between shared cells and non-shared cells of the PLMNs sharing the cell e.g. due to unnecessary measurement and reporting of cells to which a mobile station may have no access (as indicated above, not every host network element has access to every neighbouring cell because the cells may simply not be in a PLMN to which the host network element has access), examples of embodiments of invention are related to minimise the load as much as possible while providing a proper signalling required for the system information provision.

As indicated above, a communication network sends system information to host network elements being located in a local communication area of the network via specified channels. For example, in the case of a GSM communication network, within a cell, an LAI is transmitted in a SI3 (System Information Type 3) message on BCCH. The LAI contains both the PLMN-ID of the cell (MCC+MNC) as well as the LAC of the cell.

Generally, for cell reselection procedure, in idle mode, the host network element (mobile station or UE) uses a BCCH allocation list (or "BA (list)") to monitor a maximum of e.g. 32 non-serving [GSM] BCCH carriers. The BA (list) is a list of ARFCNs broadcast in SI2 (System Information Type 2) message on BCCH (also referred to as BCCH frequency list). (It is also possible that SI2bis and SI2ter messages are used.)

It is to be noted that a local communication area or cell may be identified by the UE when synchronising to the BCCH carrier of the cell, by reading the BSIC sent on each SCH burst of the cell. A BSIC identifies a particular base station or the like in such a manner that the combination of ARFCN and BSIC identifies a given cell.

On the other hand, for measurement, reporting required for example for mobility purposes, in dedicated mode, the host network element (mobile station or UE) uses, when available, a list indicating neighbouring cells, such as a NCL. The NCL may be derived from the combination of a list of frequencies of neighbouring cells such as indicated in the BA (list) and information identifying base stations, etc. such as the BSIC list. By means of this, cells are indicated on which measurements are to be taken (and possibly reported).

It is to be noted that in a GSM based network, the NCL may be an indexed list of cells where each indexed cell points to an ARFCN and BSIC combination. For measurement reporting required, for example, for mobility purposes in dedicated mode, the host network element (mobile station or UE) uses the BA (list) that may be signalled in SI5/SI5bis/SI5ter messages on a control channel, such as SACCH, and the BSIC list that may be signalled in control channel messages, such as MEASUREMENT INFORMATION messages on SACCH. Alternatively, a host network element may use a BA (list) built from BCCH (SI2/SI2bis/SI2ter) and the BSIC list built from BCCH (SI2quater).

Furthermore, for measurement reporting in packet transfer mode, the UE may use, similar to dedicated mode, the NCL derived from the combination of the BA (list) and if available the BSIC list received on BCCH. The BSIC list may be obtained from the GPRS BSIC description in SI2quater (if broadcast).

It is to be noted that frequencies used by mobile stations or UEs may be added to or removed from the BA (list), e.g. by means of corresponding order messages like PACKET MEASUREMENT ORDER and PACKET CELL CHANGE ORDER messages sent on PACCH.

The identification element for identifying the base station communicating in a local communication area, i.e. a BS or the like, may have different forms. For example, a BSIC may consist of 6 bits equally split between a NCC of 3 bits and a BCC of 3 bits. While the NCC does not allow to explicitly identify a PLMN (a PLMN ID consists, for example, of 24 bits and contains MCC and MNC), it allows to distinguish between PLMNs. Therefore, it should be ensured that the same NCC is not used in adjacent PLMNs which may use the same BCCH carrier in neighbouring areas.

In dedicated mode, it is possible to use a permission indication element for adjusting which cells are to be monitored by a host network element. For example, a communication network may control which cells are to be monitored by a UE by means of a NCC Permitted information element (also referred to as legacy NCC Permitted information element).

NCC Permitted may be sent to a host network element by means of broadcasting it in SI2 on BCCH, or by signalling it on SI6 on SACCH. The NCC Permitted information element may include a bitmap of NCCs so as to provide a definition of the allowed NCCs on the BCCH carriers to be reported in the MEASUREMENT REPORT message by the host network elements mobile stations in the cell. In other words, the permission indication may be used to set the host network elements such that they monitor and report only cells of which the NCC included in the respective BSIC matches with the indicated NCC(s) in the NCC Permitted information element.

In case network sharing is not used, e.g. when (Full) MOCN is not used, a cell broadcasts a single PLMN-ID (for example, as described above, in the LAI in SI3). When network sharing (e.g. MOCN) is used for at least one cell (i.e. the cell is shared between different PLMNs), the PLMN-ID may be a common PLMN-ID. Otherwise, in case Full MOCN is used as a network sharing principle, a cell shared between different PLMNs broadcasts the PLMN-ID of all these PLMNs (i.e. multiple PLMN-IDs). It is to be noted that in case Full MOCN is added on top of MOCN, the shared cell may also broadcast the common PLMN-ID in which case the common PLMN ID is broadcast as per MOCN requirements so that it can be identified and used by a non-supporting host network element (for example it is broadcast, as part of the LAI in SI3).

In the following, examples of embodiments of the invention are described. Specifically, examples of embodiments are described which support mobility and cell re-selection in a shared network environment in connection with a scenario as depicted schematically in FIGS. 1 to 3.

Generally, according to examples of embodiments of the invention, a set of rules is provided which, when being implemented in a shared network configuration, provide signalling procedures for system information like of neighbouring cell information both in the shared cell(s) and in the neighbouring (non-shared) cell(s) thereof. Furthermore, allocation and usage of parameters for minimising the load (processing and signalling) on the host, network element side are described by means of a permission indication parameter or element in combination with a network identification element, such as parameters based on a NCC and NCC Permitted in the PLMNs sharing a cell in the area where sharing is applied.

When using a MOCN/Full MOCN scenario as an example for illustrating a mechanism according to examples of embodiments of the invention, mobility procedures between a cell shared among several PLMNs and the neighbouring cells of these PLMNs include that in a cell shared among several PLMNs, a single information element indicating radio frequencies of channels of neighbouring cells of all sharing PLMNs is transmitted. For example, a BA (list) is broadcast which is essentially the union of ARFCNs covering cells, from all these PLMNs, that are neighbouring to the shared cell.

Furthermore, according to examples of embodiments of the invention, a communication network such as a PLMN of which one or more cells are shared must be allocated at least two network identification elements, e.g. NCCs: one for the shared cell(s) and one for the non-shared cells. These two network identification elements (NCCs) are used locally in the area where sharing is applied. The other PLMNs sharing the cell of course have different NCCs (different from each other from the said two NCCs).

Moreover, in a cell shared among several communication networks, when there is used a network sharing according to Full MOCN, one permission indication such as a NCC Permitted is signalled for each of the communication networks so as to control in this cell the monitoring and reporting of cells by supporting host network elements like mobile stations or UEs registered to these respective PLMNs. This is preferable in case of a signalling of multiple PLMN-IDs for supporting host network elements.

In order to provide mobility in a shared network environment as described above, one approach may be to broadcast individual PLMN-specific neighbour cell lists by the network. However, such a solution is not preferable given at least the likely presence of duplicate information across such lists. In addition, such an approach may be not compatible with legacy mobiles and would not be applicable when a configuration according to MOCN is used.

Instead, according to examples of embodiments of the invention, it is proposed to realise network sharing on the basis of two different sets of information, which can be summarised as common information and dedicated (PLMN-specific) information. Common information represent system information or the like which entirely or in parts applies to all PLMNs sharing the same cell. This information is applicable to both non-supporting host network elements and supporting host network elements. On the other hand, dedicated PLMN-specific information applies typically to a single PLMN, but possibly multiple PLMNs, of the PLMNs sharing the same cell. According to examples of embodiments, this dedicated information is only applicable to supporting host network elements.

On the basis of these two types of information transmitted as system information in a shared network environment, according to examples of embodiments of the invention, when a host network element such as a UE is in idle mode or the like and performs a processing for cell (re-)selection in a packet transfer mode (when measurement reporting is not used), depending on the type of the host network element as a supporting or non-supporting host network element, the following procedures and processing may be executed.

A non-supporting UE is configured to derive neighbour cell information based on the common information, i.e. without, using the dedicated PLMN-specific information.

On the other hand, a supporting UE is configured to derive neighbour cell information for a PLMN (according to the registered PLMN (incl. ePLMN)) based on the common information and the dedicated PLMN-specific information applicable for this PLMN.

According to further examples of embodiments of the invention, the dedicated (PLMN-specific) information may include one or both of information being not part of the common information that is applicable to this PLMN, and information that identifies which parts of the common information applies to this PLMN.

According to further examples of embodiments of the invention, on the basis of the two types of information transmitted as system information in a shared network environment, when a host network element such as a UE is in dedicated mode and dual-transfer mode for cell measurement reporting, the following procedures and processing may be executed.

Supporting and non-supporting host network elements or UEs are provided by the network on a corresponding channel, such as e.g. on SACCH, a new NCL adjusted according to the PLMN (ePLMN) to which the host network element is registered. Additionally or alternatively, adjustment is done by means of a permission indication such as a NCC Permitted information element. Otherwise, or in case the NCL on SACCH or the like is not available, the host network elements are configured to use a NCL (common information for non-supporting UEs or, for supporting UEs, common information combined with dedicated (PLMN-specific) information according to the registered PLMN (incl. ePLMN)) provided on BCCH.

According to further examples of embodiments of the invention, on the basis of the two types of information transmitted as system information in a shared network environment, when a host network element such as a UE is in a packet transfer mode for cell measurement reporting, the following procedures and processing may be executed.

For supporting and non-supporting host network elements, the network may adjust the NCL according to the PLMN to which the host network element is registered, by adding and/or removing frequencies that need and/or need not be monitored and reported.

In the following, according to examples of embodiments of the invention, a set of rules is proposed for implementing a mechanism for controlling and supporting mobility of host network elements in a communication environment where network sharing is employed. For illustrative purposes, reference is made to a network configuration as depicted in FIGS. 1 to 3, i.e. to network sharing according to MOCN and Full MOCN.

Unless otherwise indicated, in the following rules, it is assumed that Full MOCN might not include MOCN. Most of the rules are also applicable to a case where MOCN is a prerequisite of Full MOCN (i.e. Full MOCN includes MOCN). Parts of the rules where differences exist will be explained separately.

[Rule 1—Full MOCN in use] The general identification of the communication networks (PLMN-IDs) of all PLMNs sharing the shared cell(s) are broadcast in the shared cell(s). A supporting host network element shah use this list for PLMN (re-)selection. A non-supporting host network element is assumed not to be able to use this list. That is, in the examples according to FIGS. 1 and 2, the PLMN-ID of PLMN-A and the PLMN-ID of PLMN-B are broadcast in the shared cell.

[Rule 1bis—MOCN in use] On the other hand, in case MOCN is in use, a common identification of communication network such as the common PLMN-ID is broadcast in the cell(s) shared between several PLMNs, e.g. as part of the LAI in SI3 on BCCH.

Regarding the list of frequencies used in neighbouring cells which is used for mobility measurement decisions and the like, such as the (unified) BA (list) described above, the following rule is implemented.

[Rule 2—MOCN and/or Full MOCN in use] As a part of the common information, an information element indicating radio frequency channels of neighbouring cells, such as the (unified) BA (list), is broadcast in a shared cell. The BA (list) includes, for example, the ARFCNs that cover the neighbouring cells of the primary PLMN (i.e. the PLMN to which the shared cell originally belongs) of the shared cell as well as the ARFCNs that cover neighbouring cells of the other PLMNs sharing the shared cell. As indicated above, the unified BA (list) in the shared cell is essentially the union of the ARFCNs for all PLMNs sharing the cell in the area where sharing is applied. Supporting and non-supporting host network elements in idle mode shall acquire this BA (list) broadcast by the network. In the examples according to FIGS. 1 and 2, the BA (list) in cell 50 includes the ARFCNs that cover the neighbouring cell 30 of PLMN-A as well as the ARFCNs that cover the neighbouring cell 40 of PLMN-B, i.e. the union of ARFCNs for PLMN-A and PLMN-B in the area where sharing is applied.

It is to be noted that for legacy (non-supporting) host network, elements being in idle mode, the unified BA list, may trigger unnecessary monitoring of ARFCNs of e.g. PLMN-B not already listed for PLMN-A. Furthermore, for supporting host network elements in idle mode, this BA list may also trigger unnecessary monitoring of ARFCNs of e.g. PLMN-A (non-shared area) not in use for PLMN-B.

According to examples of embodiments of the invention, these two above issues are seen as being acceptable for idle mode operation.

On the other hand, according to different examples of embodiments of the invention, it is preferred to overcome this situation by using e.g. a permission indication.

For example, the use of a parameter like NCC Permitted information element is expanded to idle mode operation. This approach will be discussed below.

Another approach may be to use distinct BA (lists) for PLMN-A and PLMN-B.

Furthermore, according to examples of embodiments of the invention, for dedicated mode operation, parameters for network identification and permission indication, such as NCCs and NCC Permitted, can be exploited as outlined hereafter.

Regarding a network identification parameter, like NCC, the following rules are implemented.

[Rule 3—MOCN and/or Full MOCN in use] Network identification elements, such as NCCs are used in such a manner that the NCCs of the PLMNs sharing the cell are all different from one another, at least in the area where sharing is applied. That is, in the example according to FIGS. 1 and 2, network identification parameters such as NCCs are used in such a manner that the NCC of PLMN-B differs from that of PLMN-A.

[Rule 3bis—MOCN in use] Furthermore, when MOCN is involved, the NCCs are used in such a manner that the NCC of the common PLMN-ID and the NCCs of the PLMNs sharing the cell are all different from one another, in the area where sharing is applied. This is also the case when MOCN and Full MOCN are used wherein then the common PLMN-ID is broadcast in parallel to the multiple PLMN-IDs (PLMN-A and PLMN-B, for example).

It is to be noted that as per [Rule 2], because the list of frequencies used in neighbouring cells such as the (unified) BA (list) broadcast in a shared cell includes ARFCNs for all PLMNs sharing the cell in the area where sharing is applied, as a result, host network elements registered to the primary PLMN of the shared cell may, when in the shared cell, unnecessarily monitor and report cells from the other PLMNs sharing the cell in addition to neighbouring cells of the primary PLMN of the shared cell (the same may apply for non-primary cells with regard to other PLMNs). It is necessary, however, that a host network element such as a UE registered to another PLMN than the primary PLMN of this cell can monitor and report cells from their own PLMN. This is especially true for non-supporting mobiles in case MOCN is used in this shared cell. In the example according to FIGS. 1 and 2, because the BA (list) sent in cell 50 includes ARFCNs for both PLMN-A and PLMN-B (cells 30 and 40), UE 20 (registered to PLMN-A) may, when in the shared cell, unnecessarily monitor and report cells from PLMN-B. It is necessary however that UE 10 (registered to PLMN-B) can monitor and report neighbouring cells of PLMN-B (i.e. cell 40).

Hence, regarding a permission indication element, such as a NCC Permitted information element, the following rules are implemented.

[Rule 4—MOCN in use] As a part of the common information, a permission indication in the form of e.g. a legacy NCC Permitted information element is broadcast in a shared cell which indicates that NCCs for all PLMNs sharing the cell are allowed, including the common PLMN-ID. In case a non-supporting host network element receives this permission indication, it shall consider this permission indication (NCC Permitted information element) as applicable, if no other permission indication (another NCC Permitted information element) is otherwise determined as applicable (see also Rule 4bis, Rule 4ter: measurement reporting). A supporting host network element shall consider this NCC Permitted information element as applicable, if Full MOCN is not used in the cell, or, in case Full MOCN is used, if no other NCC Permitted information element is otherwise determined as applicable (see Rule 4bis, Rule 4ter, Rule 7).

[Rule 4bis—MOCN and/or Full MOCN in use] For measurement reporting in dedicated mode (dual transfer mode), the network may signal on a control channel, such as SACCH, a permission indication like a legacy NCC Permitted information element indicating that the NCC of the PLMN to which the mobile station is registered (or an ePLMN thereof) is allowed in the area where sharing is applied. In addition, in case MOCN is used (alone or on top of Full MOCN), the NCC of the common PLMN-ID is also indicated as allowed in the area where sharing is applied. Otherwise, in case only Full MOCN is used (i.e. without MOCN), the NCC of the shared cells as per Rule 5 is indicated as being allowed in the area where sharing is applied. In case a host network element receives the respective permission indication, it shall consider this permission indication (NCC Permitted information element) as applicable in dedicated mode (dual transfer mode) for measurement reporting. Otherwise the host network element shall consider the applicable NCC Permitted information element broadcast in the cell [see Rule 4] for measurement reporting in dedicated mode (dual transfer mode).

As indicated above, conventionally, a permission indication like the NCC Permitted information element is used for measurement reporting in dedicated mode, dual transfer mode, and if PBCCH is deployed (which is not the case) in packet transfer mode. According to examples of embodiments of the invention, it is proposed to use NCC Permitted for measurement reporting in packet transfer mode when PBCCH is not used, resulting in the following rule.

[Rule 4ter—MOCN and/or Full MOCN in use] In packet transfer mode, the network may signal on a control channel like PACCH a permission indication such as a NCC Permitted information element indicating that the NCC of the PLMN to which the mobile station is registered, (or an ePLMN thereof) is allowed in the area where sharing is applied, in addition, in case MOCN is used (alone or on top of Full MOCN), the NCC of the common PLMN-ID is also indicated as allowed in the area where sharing is applied. Otherwise, in case only Full MOCN is used (i.e. without MOCN), the NCC of the shared cells as per Rule 5 is indicated as being allowed in the area, where sharing is applied. In case a host network element receives the respective permission indication, it shall consider this NCC Permitted information element as applicable for measurement reporting in packet transfer mode. Otherwise the host network element may consider the applicable NCC Permitted information element broadcast in the cell [see Rule 4] for measurement reporting in packet transfer mode.

If for example network sharing is based on only Full MOCN, a supporting host network element such as a UE that is registered to a PLMN sharing the shared cell which is not the primary PLMN of the shared cell must be able to monitor and report cells from these two PLMNs, thus enabling mobility within the shared area and with the non-shared area of the mobile station's own PLMN. However, it may be the case that non-shared cells of the primary PLMN of the shared cell are not excluded from a list. This may result in unnecessary monitoring and reporting by the host network elements. Hence, according to examples of embodiments of the invention, the following rules are implemented.

[Rule 5—Full MOCN only] The network identification, such as the NCC, for a shared cell is different from the network identification or NCC for the neighbouring non-shared cells of the same PLMN, and furthermore, as per Rule 3, from the NCCs for the neighbouring cells of the other PLMNs sharing the cell, in the area where sharing is applied.

A consequence of this rule is that a communication network of which one or more cells are shared has at least two network identifications or NCCs: one for the shared cells and one for the non-shared cells in the area where sharing is applied.

In the example according to FIGS. 1 and 2, the NCC for the shared cell 50 of PLMN-A must be different from the NCC for the non-shared cell 30 of PLMN-A and from the NCC of PLMN-B.

Moreover, it is to be noted that this rule 5 may be replaced in case MOCN is used as a prerequisite to Full MOCN by the following rule. That is, as an alternative rule 5 [Full MOCN in use]: as a dedicated (PLMN-specific) information, a permission indication such as a NCC Permitted information element is signalled to supporting host network elements registered to a PLMN sharing the shared cell that is not the primary PLMN of the shared cell, wherein the NCC Permitted information element indicates that the NCC of the common PLMN-ID is permitted, the NCC for the non-shared cells of the primary PLMN of the shared cell is not permitted and the NCC for the non-shared cells of the PLMN to which they are registered is permitted, in the area where sharing is applied.

Furthermore, in addition to the first rule 5, the following rules apply in case of a network sharing scenario with bull MOCN only.

[Rule 5bis—Full MOCN only] As a common information, a permission indication like the legacy NCC Permitted information element broadcast in a shared cell indicates that the network identification or NCC for the shared cell and the NCC for the non-shared cells of the same PLMN are permitted and that the NCCs of the other PLMNs sharing the cell are not permitted. It is to be noted that Rule 4 takes precedence over Rule 5bis.

By means of this, mobility for non-supporting host network elements within the Primary PLMN (PLMN-A) is ensured.

In addition, as [Rule 5ter—Full MOCN only], as a dedicated (PLMN-specific) information, a permission indication like a NC permitted information element is signalled to supporting host network elements like supporting UEs registered to a PLMN sharing the cell that is not the primary PLMN of the shared cell, wherein the NCC Permitted information element indicates that the NCC for the shared cell is permitted, the NCC for the non-shared cells of the same PLMN as the shared cell is not permitted and the NCC for the non-shared cells of the PLMN to which they are registered is permitted, in the area where sharing is applied.

In the example according to FIGS. 1 and 2, a supporting UE registered to PLMN-B (e.g. UE 10) is signalled a NCC Permitted information element indicating that the NCC of PLMN-B is permitted, the NCC of the shared area of PLMN-A (alternative network identification element) is permitted and the NCC of the non-shared area of PLMN-A is not permitted.

[Rule 5quater—MOCN and Full MOCN in use] As a dedicated (PLMN-specific) information, a permission indication such as a NCC Permitted information element is signalled to a supporting host network element registered to a PLMN sharing the cell that is not the primary PLMN of the shared cell, wherein the signalled NCC Permitted information element indicates that the network identification or NCC of the common PLMN-ID is permitted, the NCC for the non-shared cells of the primary PLMN as the shared cell is not permitted and the NCC for the non-shared cells of the PLMN to which they are registered is permitted, in the area where sharing is applied.

As indicated above, according to examples of embodiments of the invention, in a cell shared among several communication networks, when there is used a network sharing according to Full MOCN, one permission indication such as a NCC Permitted information element is signalled for each of the communication networks so as to control in this cell the monitoring and reporting of cells by supporting host network elements like UEs registered to these respective PLMNs. For this purpose, the following rule is applied.

[Rule 6—Full MOCN in use] As a dedicated (PLMN-specific) information, and in consequence to Rule 5ter and Rule 5quater (it is to be noted that in case MOCN is used as prerequisite of Full MOCN, the rule to be referred to is new rule 5), if n PLMNs are sharing a cell ($PLMN_1 \ldots PLMN_n$), n corresponding NCC Permitted information elements are broadcast in the shared cell. Thus, an NCC Permitted, applies to mobile stations registered to $PLMN_i$ (with i–1 . . . n) (or an ePLMN thereof). These information elements are set as per Rule 5ter or Rule 5quater as applicable (again, it is to be noted that in case MOCN is used as prerequisite of Full MOCN, the rule to be referred to is new rule 5).

[Rule 7—Full MOCN in use] A supporting host network element ignores the legacy NCC Permitted information element broadcast in a cell if it detects a dedicated (PLMN specific) NCC Permitted information element, that is broadcast as per Rule 6 and is applicable. The host network element may determine that an NCC Permitted information element broadcast for a given PLMN is applicable if the host network element is registered to this PLMN or to an ePLMN thereof.

As indicated above, conventionally, a permission indication like NCC Permitted field is not applicable in idle mode. It is only used for measurement reporting in dedicated mode, dual transfer mode, and if PBCCH is deployed (which is not the case) in packet transfer mode. Thus, according to examples of embodiments of the invention, the use of a permission indication like NCC Permitted information element is expanded for cell (re)selection in idle mode and packet transfer mode.

Thus, according to these examples of embodiments of the invention, the following rules are implementable.

[Rule 8] If the host network element or UE determines that a permission indication like an NCC Permitted information element is applicable (see e.g. Rule 4, Rule 7), it may use it for cell re-selection in idle mode such that cells of which the NCC is not indicated as allowed are not considered for cell re-selection.

[Rule 8bis—MOCN and/or Full MOCN in use] As per Rule 4ter, the network may signal on a control channel like PACCH a permission indication like an NCC Permitted information element indicating that the network identification or NCC of the PLMN to which the host network element or UE is registered (or an ePLMN thereof) and the NCC of the common PLMN-ID are allowed, in the area where sharing is applied. If this is received by the host network element, it may consider this NCC Permitted information element as applicable for cell re-selection in packet transfer mode. Otherwise the host, network element may consider the applicable NCC Permitted information element broadcast in the cell [see Rule 4] for cell-reselection in packet transfer mode.

According to further examples of embodiments of the invention, as a complementary approach to the above, cells to be monitored and reported may be explicitly listed by means of a system information such as a Neighbour Cell List tailored to the host network element or mobile station. In this case, the network is able to adjust the frequency indicating list such as a BA(list), and the BSIC list to the host network element.

While the above set of rules defines the setting of parameters like NCC and NCC Permitted in the area where sharing is applied, and the signalling of information in a shared cell, according to further examples of embodiments, signalling in non-shared cells that are neighbouring to the shared cell is set as a function of the primary PLMN of these cells, provided this PLMN is one sharing the shared cell.

Specifically, according to examples of embodiments of the invention, in such neighbouring non-shared cells, the network is configured to send an information element indicating the radio frequency channels of neighbouring cells of the cell in question (i.e. where the information is broadcast, here the non-shared cell), such as a BA (list) which includes also the ARFCNs that cover the shared cell(s). Furthermore, a permission indication such as a legacy NCC Permitted information element is to be set such that the NCC for the shared cell is permitted. Other settings may be as in conventional communication network configurations.

That is, in a non-shared cell being neighbouring to a shared cell and controlled by the primary PLMN (such as cell 30 of PLMN-A in FIG. 1 or 2), with common system information, the network sends to a host network element being located in the non-shared cell an information element indicating radio frequency channels used by the at least one shared local communication area and neighbouring local communication areas of the communication network sharing the at least one shared local communication area. Furthermore, as permission indication, e.g. a (legacy) NCC Permitted information element is sent to the host network element indicating the NCC used for the shared cell is permitted.

Figure 4:
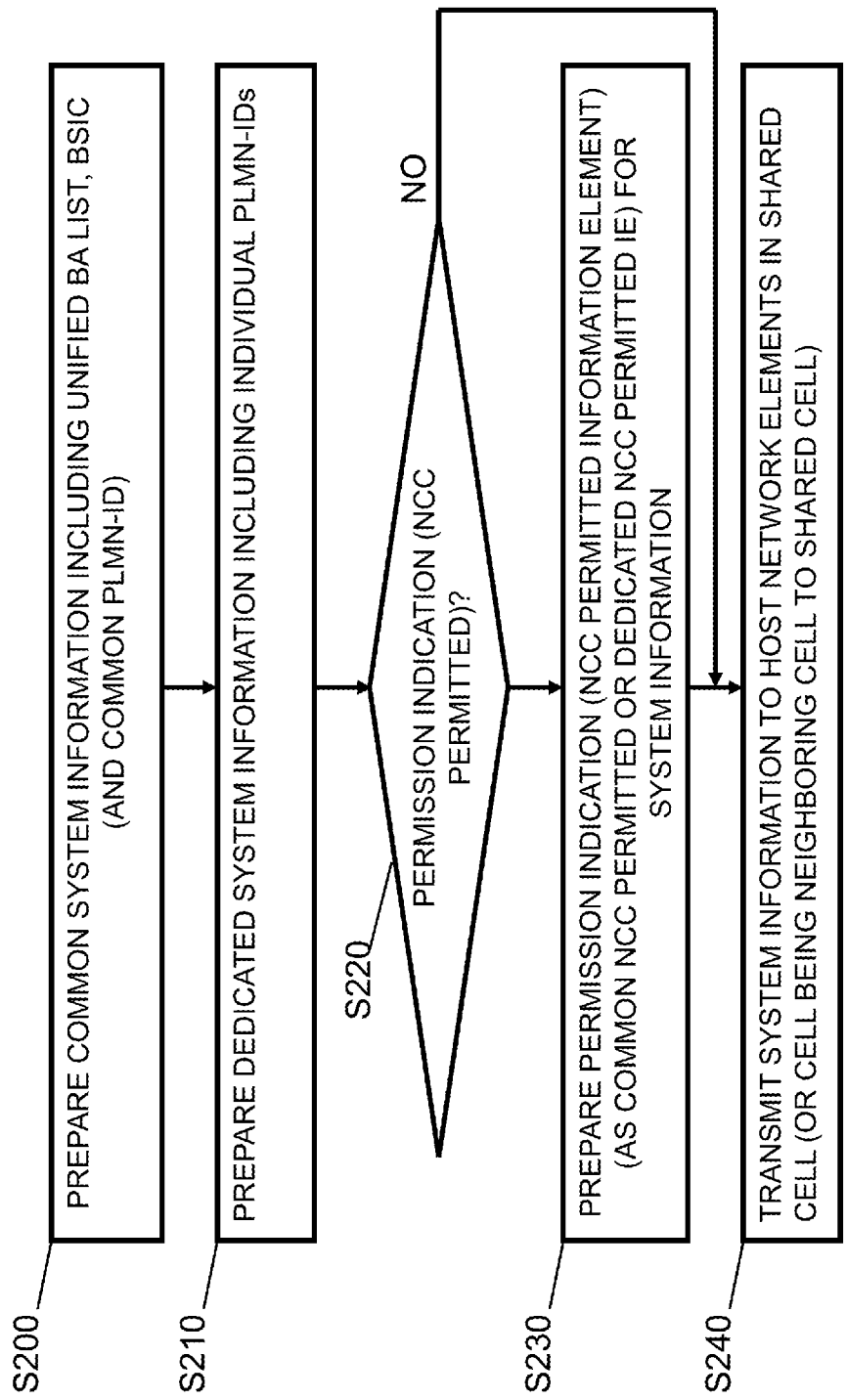
FIG. 4 shows a flowchart illustrating a processing executed in a communication network element according to examples of embodiments of the invention.

FIG. 4 shows a flowchart illustrating a processing executed in a communication network element according to examples of embodiments of the invention. For example, the processing according to the flow chart of FIG. 4 is executed in a network element, such as a BSC, RNC or the like, of a primary PLMN acting according to the above defined rules. Specifically, the processing is related to the signalling in a shared local communication area or cell, such as cell 50 in FIG. 1 or 2.

In step S200, a set of common system information is prepared which applies to the communication networks or PLMNs sharing the (at least one) shared local communication area for communicating with host network elements. The common system information includes, for example, identification elements of communication networks, such as the common PLMN-ID, lists of radio frequencies used by neighbouring cell, such as a the unified BA (list), etc.

In step S210, which may be executed also in parallel to step S200 or before or after step S200, a set of dedicated system information is prepared which applies to at least one of the communication networks sharing the shared local communication area. The dedicated system information is addressed only to supporting host network elements and includes, for example, identification elements of communication networks, such as the individual PLMN-IDs of all sharing PLMNs.

In step S220, it is checked whether a permission indication, like an NCC Permitted information element, is to be sent to host network elements, for example on the basis of operator settings or a decision whether an unnecessary measurement by host network elements is acceptable.

If the decision is negative, i.e. no permission indication is to be sent, the processing may directly proceed to step S240 for transmitting the system information including the information prepared in steps S200 and S210.

Otherwise, if the decision is affirmative in step S220, in step S230, a permission indication element, such as an NCC Permitted information element, indicating on the basis of the network identification elements of the communication networks (i.e. the respective NCC) is prepared which indicates which neighbouring local communication areas are allowed to be considered in at least one of a reselection procedure and a local communication area measurement and reporting procedure conducted by a host network element. (It is to be noted that measurement does not always require reporting, but for the sake of simplicity "measurement and reporting" refers to either only measurement, or both measurement and reporting procedures.)

It is to be noted that the decision step S220 may be omitted in case the permission indication is always to be prepared and sent. Furthermore, the preparation of the permission indication may be done in parallel to the processing in steps S200 and S210.

In step S240, the system information including the common and dedicated system information prepared in steps S200 and S210 and possibly the permission indication prepared in step S230 is transmitted to host network elements being located in the shared local communication area. Also network identification elements like NCCs are signalled to the host network elements.

Figure 5:
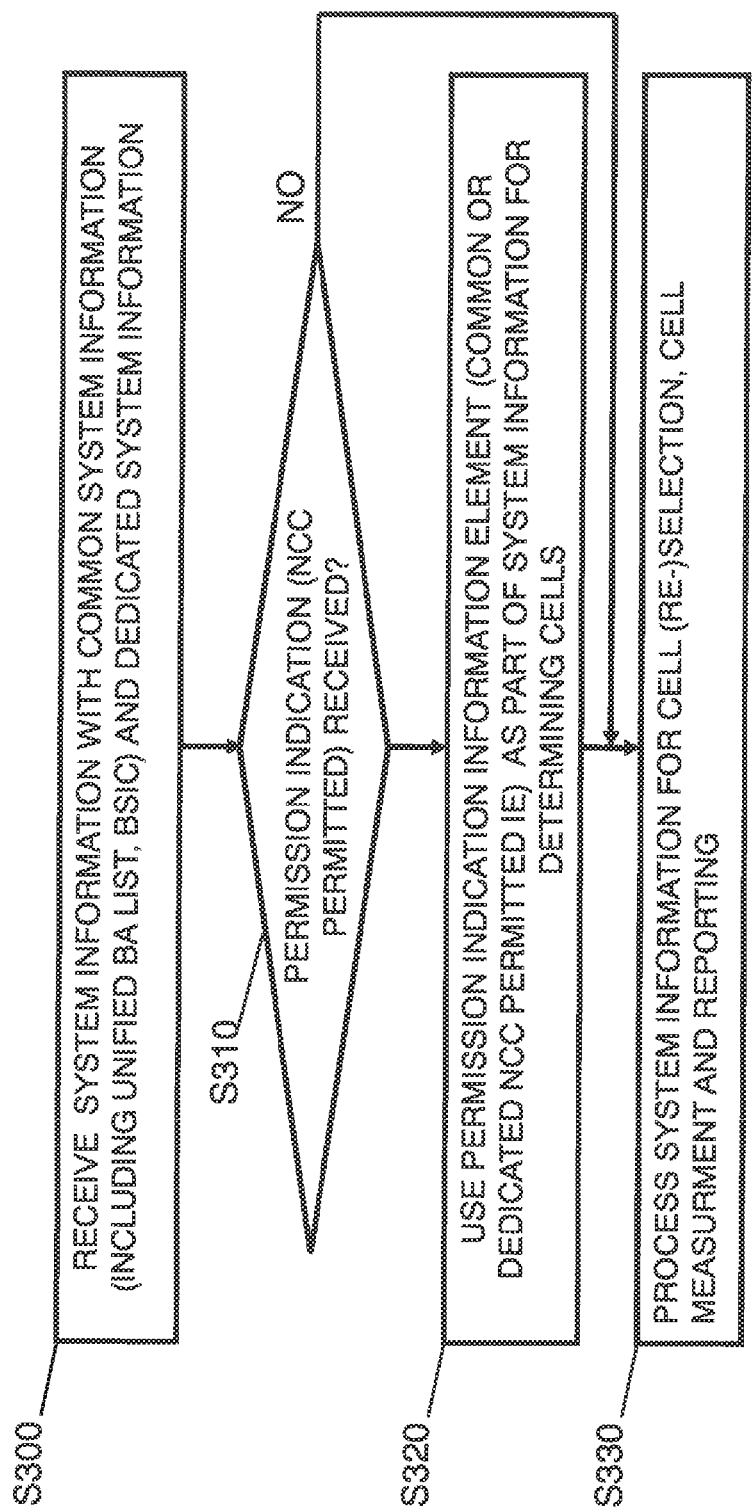
FIG. 5 shows a flowchart illustrating a processing executed in a host network element according to examples of embodiments of the invention.

FIG. 5 shows a flowchart illustrating a processing executed in a host network element according to examples of embodiments of the invention. For example, the processing according to the flow chart of FIG. 5 is executed in a host network element, such as a UE or the like being registered to a PLMN acting according to the above defined rules. Specifically, the processing is related to the signalling in a shared local communication area or cell, such as cell 50 in FIG. 1 or 2.

In step S300, the UE receives system information as transmitted by the network in step S240 of FIG. 5, i.e. system information including a set of common system information which applies to communication networks sharing the shared local communication area, a set of dedicated system information which applies to at least one of the communication networks sharing the at least one shared local communication area, wherein the dedicated system information is addressed only to supporting host network element(s), and possibly a permission indication element.

In step S310, it is determined whether applicable permission indication information is received, such as a NCC Permitted information element. If the determination is negative, the processing proceeds to step S330 where a processing of the received system information is executed.

Otherwise, if an applicable permission indication element (dedicated or common permission indication such a NCC Permitted information element (IE)) is received (YES in step S310), the processing proceeds to step S320 where the received and applicable permission indication is used as a part of the system information in preparation of in the processing in step S330.

In step S330, the received system information are processed. That is, at least the common system information are used in the processing (in a non-supporting UE) for e.g. a cell reselection procedure or a cell measurement and reporting procedure conducted by the host network element, wherein in case an applicable permission indication element is received and prepared (in step S320), a cell selection or the like is executed in connection with the processing.

Figure 6:
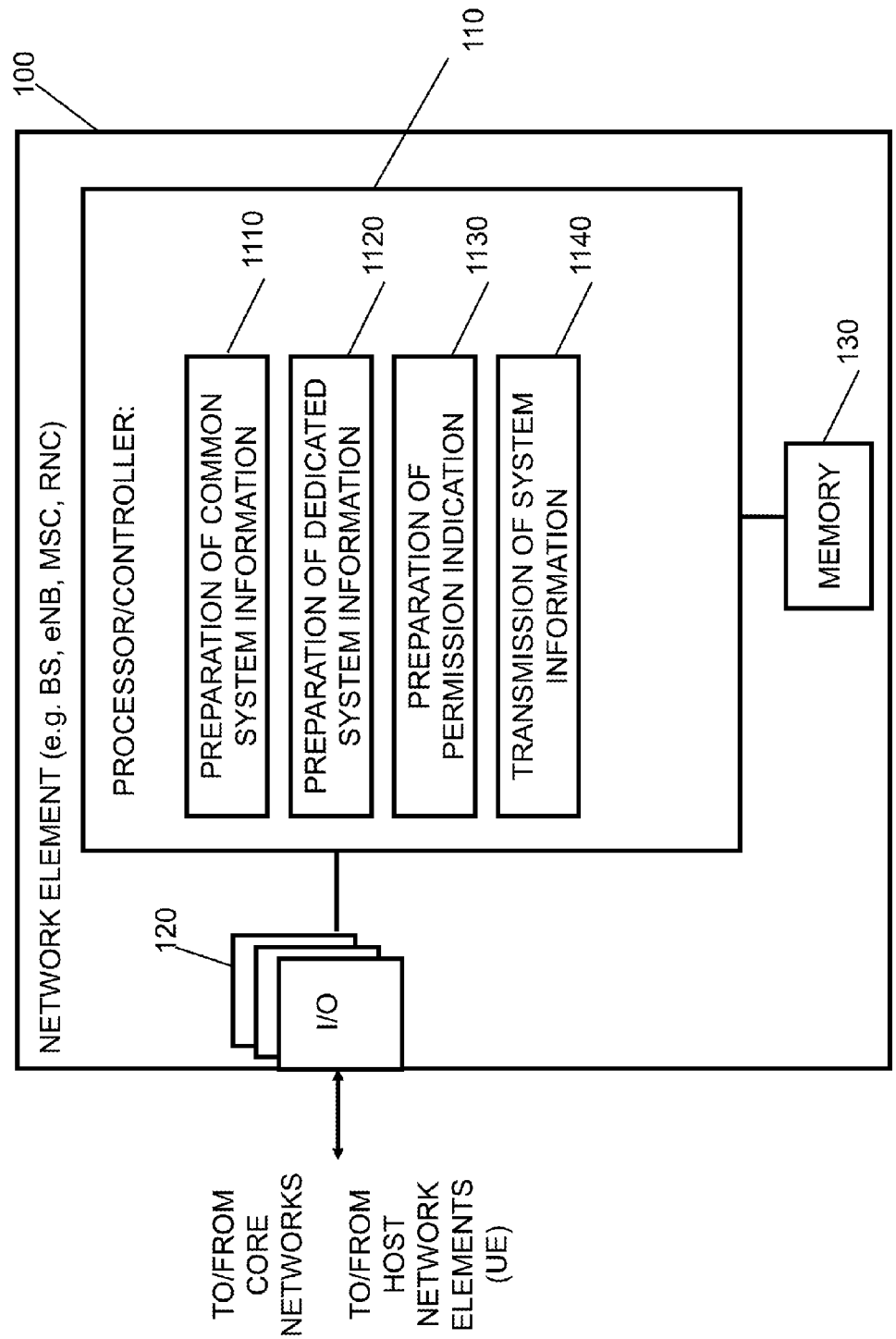
FIG. 6 shows a block circuit, diagram of a communication network element including processing portions conducting functions according to examples of embodiments of the invention.

FIG. 6 shows a block circuit diagram of a communication network element including processing portions conducting functions according to examples of embodiments of the invention. Specifically, in FIG. 6, a block circuit diagram illustrating a configuration of a network element, such as a RNC, BSC, MME, SGSN, etc., is shown, which is configured to implement functions for preparing and signalling (common and dedicated) system information and permission indication, and thus of the processing as described in connection with the examples of embodiments of the invention according to FIG. 4.

It is to be noted that the network element shown in FIG. 6 may include several further elements or functions besides those described herein below, which are omitted herein for the sake of simplicity as they are not essential for understanding the invention. Furthermore, even though reference is made to communication network element like an BSC etc., the communication network element may be also another device having a similar function, such as a modem chipset, a chip, a module etc., which can also be part of a communication network element or attached as a separate element to a communication network element, or the like. Moreover, it is to be noted that a network element according to examples of embodiments of the invention does not need to include all of the processing portions described below, as long as the main functionality regarding the network sharing support as described above can be executed.

The network element 100 may include a processing function or processor 110, such as a CPU or the like, which executes instructions given by programs or the like related to the network sharing, etc. The processor 110 may include one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 120 denotes interface or transceiver or input/output (I/O) units connected to the processor 110. The I/O units 120 may be used for communicating with elements of the communication network, such as a host network element like a UE, or other communication network control element like a GGSN or the like. The I/O units 120 may be a combined unit including communication equipment towards several network elements, or may include a distributed structure with a plurality of different interfaces for different network elements. Reference sign 130 denotes a memory usable, for example, for storing data and programs to be executed by the processor 110 and/or as a working storage of the processor 110.

The processor 110 is configured to execute processing related to the above described network sharing mechanism. In particular, the processor 110 includes a sub-portion 1110 as a processing portion which is usable as a preparation portion for the common system information. Furthermore, the processor 110 includes a sub-portion 1120 as a processing portion which is usable for preparing the dedicated system information, furthermore, the processor 110 may include a sub-portion 1130 as a processing portion which is usable for preparing a (dedicated and/or common) permission indication element. Moreover, the processor 110 may include a sub-portion 1140 as a processing portion which is usable for transmitting the system information including at least one of common system information, dedicated system information and permission indication element to a host network element. A determination of receiving host network elements may be done in sub-portion 1130 or 1140, if necessary.

Figure 7:
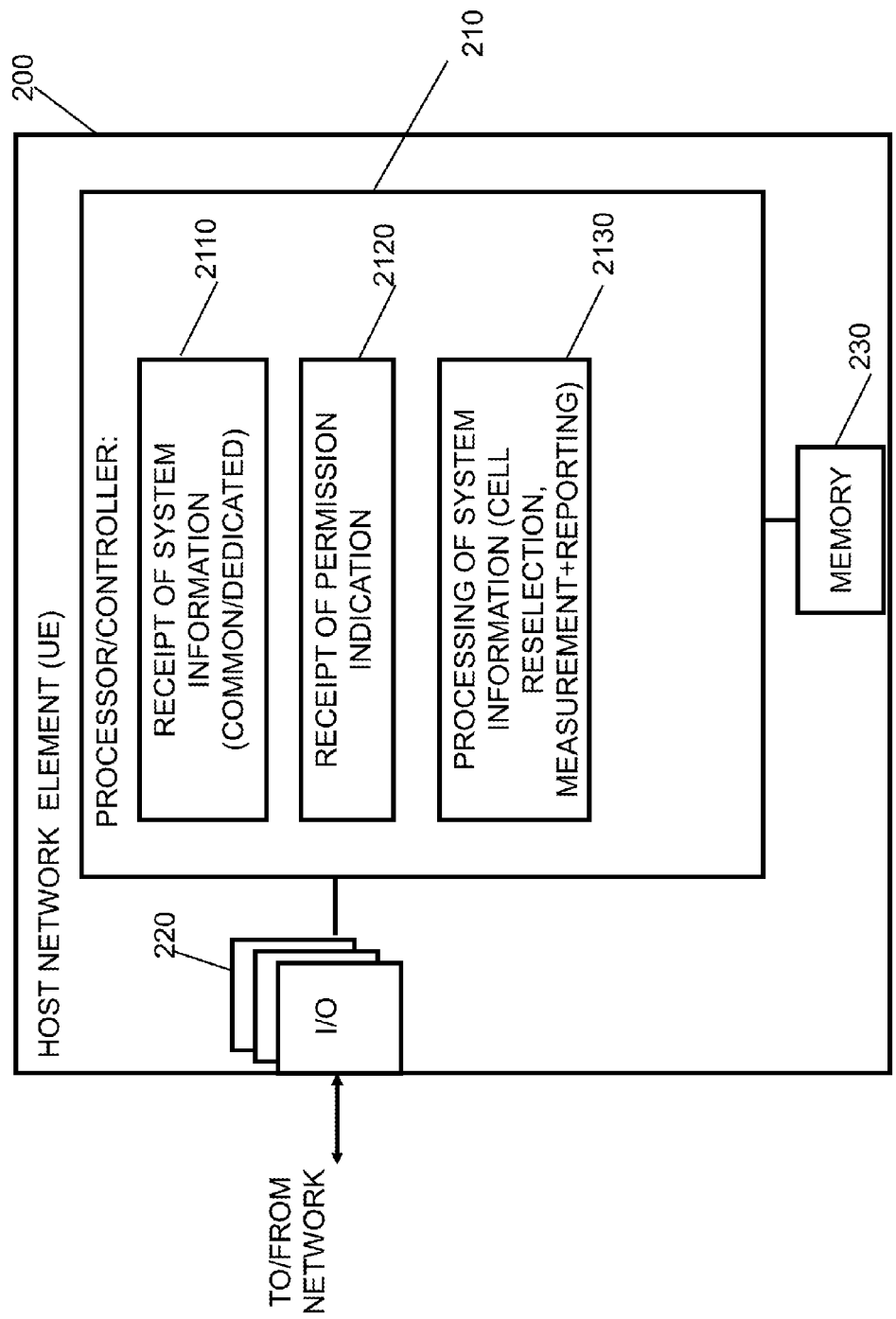
FIG. 7 shows a block circuit diagram of a host network element including processing portions conducting functions according to examples of embodiments of the invention.

In FIG. 7, a block circuit diagram illustrating a configuration of a host network element, such as a UE, is shown, which is configured to implement the processing as described in connection with the examples of embodiments of the invention according to FIG. 5, for example.

It is to be noted that the host network element shown in FIG. 7 may include several further elements or functions besides those described herein below, which are omitted herein for the sake of simplicity as they are not essential for understanding the invention. Furthermore, even though reference is made to a host network element such as a UE or mobile station, the host network element may be also another device having a similar function, such as a modem chipset, a chip, a module etc., which can also be part of a UE or the like or attached as a separate element to a UE, or the like. Moreover, it is to be noted that a host network element according to examples of embodiments of the invention does not need to include all of the processing portions described below, as long as the main functionality regarding the network sharing mechanism can be executed.

The host network element 200 may include a processing function or processor 210, such as a CPU or the like, which executes instructions given by programs or the like related to the network sharing, etc. The processor 210 may include one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 220 denotes interfaces or transceivers or input/output (I/O) units connected to the processor 210. The I/O units 220 may be used for communicating with network elements of the communication network, such as a base station or the like. The I/O units 220 may be a combined unit including communication equipment towards several of the network element in question, or may include a distributed structure with a plurality of different interfaces for each network element in question. Reference sign 230 denotes a memory usable, for example, for storing data and programs to be executed by the processor 210 and/or as a working storage of the processor 210.

The processor 210 is configured to execute processing related to the above described network sharing mechanism. In particular, the processor 210 includes a sub-portion 2110 as a processing portion which is usable as a receiver for the system information. Moreover, the processor 210 may include a sub-portion 2130 as a processing portion which is usable for receiving (or determining in the received system information) an applicable permission indication such as an NCC Permitted information element. Furthermore, the processor 210 includes a sub-portion 2130 as a processing portion which is usable for processing the received system information (according to whether it is implemented in a supporting or non-supporting host network element, only common system, information or both common and dedicated system information, and with or without consideration of an applicable permission indication) with regard to a cell re-selection or cell measurement and reporting, for example.

According to examples of embodiments of the invention, in a shared cell, a single BA (list) defined as a union of ARFCNs covering the neighbouring cells of all PLMNs sharing the cell is transmitted. In order to avoid that there is an unnecessary monitoring of ARFCNs, measures are proposed. As an alternative, it may be considered to keep an existing BA (list) of the shared cell unchanged (applying for the primary PLMN of the cell), and to signal PLMN-specific delta lists that can add and remove ARFCNs from the cell's BA (list) to construct PLMN-specific BA (lists). However, in such a case, specifically in case neighbour cell lists are defined to support legacy mobility, the additional system information content would be minimised. In other words, if the NCL is built under legacy support constraints, the additional information for Full MOCN would be the dedicated (PLMN specific) NCC Permitted parameters and a list of PLMN IDs in the minimum case.

For the purpose of the present invention as described herein above, it should be noted that an access technology via which signalling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention includes also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or include any device, apparatus, unit or means by which a station, entity or other user equipment may connect to and/or utilise services offered by the access network; such services include, among others, data and/or (audio-) visual communication, data download etc.;

a user equipment or communication network element may be any device, apparatus, unit or means by which a system user or subscriber may experience services from an access network, such as a mobile phone, personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatus and/or modules thereof, or as examples of entities including apparatus and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatus, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorisation, keying and/or traffic protection;

devices, apparatus, units or means can be implemented as individual devices, apparatus, units or means, but this does not exclude that they are implemented in a distributed fashion throughout the system, as long as the functionality of the device, apparatus, unit or means is preserved. For example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module including such chip or chipset; this, however, does not exclude the possibility that a functionality of an apparatus or module, instead of being hardware implemented, be implemented as software in a (software) module such as a computer program or a computer program product including executable software code portions for execution/being run on a processor;

a device may be regarded as an apparatus or as an assembly of more than one apparatus, whether functionally in cooperation with each other or functionally independently of each other but in a same device housing, for example.

According to examples of embodiments of the invention, there is provided an apparatus including a common system information preparation means for preparing a set of common system information which applies to communication networks sharing at least one shared local communication area for communicating with host network elements, a dedicated system information preparation means for preparing a set of dedicated system information which applies to at least one of the communication networks sharing the at least one shared local communication area, wherein the dedicated system information is addressed only to host network elements being configured to support sharing of a local communication area, and a transmitting means for sending to host network elements being located in a shared local communication area system information including the set of common system information and the set of dedicated system information, wherein the common system information includes an information element indicating radio frequency channels used by neighbouring local communication areas of the communication networks sharing the at least one shared local communication area.

According to further examples of embodiments of the invention, there is provided an apparatus including a system information receiving means for receiving system information, the system information including a set of common system information which applies to communication networks sharing at least one shared local communication area for communicating with host, network elements, and a set of dedicated system information which applies to at least one of the communication networks sharing the at least one shared local communication area, wherein the dedicated system information is addressed only to host network elements being configured to support sharing of a local communication area, wherein the common system information includes an information element indicating radio frequency channels used by neighbouring local communication areas of the communication networks sharing the at least one shared local communication area, and a system information processing means for processing at least the set of common system information for one of a reselection procedure, a local communication area measurement procedure and a local communication area measurement and reporting procedure conducted by a host network element.

According to further examples of embodiments of the invention, there is provided an apparatus including a common system information preparation means for preparing a set of common system information which applies to local communication areas of a communication network sharing at least one shared local communication area with other communication areas for communicating with host network elements, a transmitting means for sending to host network elements being located in a non-shared local communication area being a neighbouring local communication area to a shared local communication area system information including the set of common system information, wherein the common system information includes an information element indicating radio frequency channels used by the at least one shared local communication area and neighbouring local communication areas of the communication network sharing the at least one shared local communication area.

As described above, there is provided a mechanism for controlling and supporting network sharing wherein common and dedicated system information are transmitted to host network elements being located in a shared cell. The common system information includes a base station identification, information for identifying a base station communicating in a cell, and an information element indicating radio frequency channels used by neighbouring cells communication networks sharing the shared cell. On the basis of the received system information, at least of the common system information, a cell reselection procedure, a local communication area measurement procedure or a cell measurement and reporting procedure is conducted by a host network element. A permission indication is further signalled which is used to limit the number of cells to be considered in the cell reselection procedure or a cell measurement and reporting procedure.

Although the present invention has been described herein before with reference to particular embodiments thereof, the present invention is not limited thereto and various modifications can be made thereto.

The above embodiments are to be understood as illustrative examples of the invention, further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus comprising:
   at least one processor, the at least one processor comprising:
   a common system information preparation device configured to prepare a set of common system information which applies to communication networks sharing at least one shared local communication area for communicating between the apparatus and host network elements,
   a dedicated system information preparation device configured to prepare a set of dedicated system information which applies to at least one of the communication networks sharing the at least one shared local communication area for communicating between the apparatus and host network elements, wherein the dedicated system information is addressed only to host network elements configured to support sharing of a local communication area, and
   a transmitting device configured to send from the apparatus to host network elements located in a shared local communication area, system information comprising the set of common system information prepared by the common system information preparation device and the set of dedicated system information prepared by the dedicated system information preparation device, wherein the set of common system information comprises an information element indicating radio frequency channels used by neighboring local communication areas of the communication networks that share the at least one shared local communication area, said neighboring local communication areas neighboring the at least one shared local communication area, wherein an information element indicating radio frequency channels used by neighboring local communication areas usable for the common system information is a list indicating absolute radio frequency channel numbers, wherein a general identification element of a communication network usable for one of the common and dedicated information is a public land mobile network identification, wherein a common general identification element of a communication network usable for the common information is a common public land mobile network identification, wherein a network identification element usable for the common information is a network color code, and wherein a permission indication usable for one of the common and dedicated information is a network color code permitted information element.

2. The apparatus according to claim 1, wherein the set of common system information further comprises a common general identification element of a communication network controlling the shared local communication area.

3. The apparatus according to claim 1, wherein the set of dedicated system information comprises a general identification element for each of the communication networks sharing the shared local communication area.

4. The apparatus according to claim 1, wherein the set of common system information further comprises a network identification element usable for distinguishing communication networks, wherein the network identification element is set such that the network identification element for a communication network controlling the shared local communication area used in the shared local communication area is different from the network identification element for the communication network controlling the shared local communication area used in a non-shared local communication area being a neighboring local communication area to the shared local communication area, and the network identification element for each communication network sharing the shared local communication area with the controlling communication network is different from each network identification element for the communication network controlling the shared local communication area, and, in case still other communication networks are sharing the shared local communication area is different from the network identification element for the still other communication networks sharing the shared local communication area.

5. The apparatus according to claim 4, wherein the at least one processor further comprises:

a permission indication preparation device configured to prepare a permission indication element indicating on the basis of the network identification element of the respective communication network which neighboring local communication areas are allowed to be considered in at least one of a reselection procedure, a local communication area measurement procedure and a local communication area measurement and reporting procedure conducted by a host network element, and a permission indication transmitting device configured to transmit the permission indication element prepared by the permission indication preparation device from the apparatus to host network elements.

6. The apparatus according to claim 5, wherein the permission indication element is set to indicate at least one of a network identification element related to the general identification element of the communication network to which a specific host network element is registered, a network identification element related to a common general identification element of the communication network controlling the at least one shared local communication area, and an alternative network identification element related to the general identification element of the communication network to which a specific host network element is registered when the communication network controls the shared local communication area.

7. The apparatus according to claim 5, wherein the permission indication preparation device is further configured to prepare a separate dedicated permission indication element set for each communication network sharing the shared local communication area, wherein the dedicated permission indication elements are addressed only to host network elements being configured to support sharing of a local communication area.

8. A method comprising:

preparing, using a processor, a set of common system information which applies to communication networks sharing at least one shared local communication area for communicating between a communication apparatus and host network elements, preparing, using a processor, a set of dedicated system information which applies to at least one of the communication networks sharing the at least one shared local communication area for communicating between the communication apparatus and host network elements, wherein the dedicated system information is addressed only to host network elements configured to support sharing of a local communication area, and transmitting, using a transmitter of the communication apparatus, from the communication apparatus to host network elements located in a shared local communication area, system information comprising the prepared set of common system information and the prepared set of dedicated system information, wherein the set of common system information comprises an information element indicating radio frequency channels used by all neighboring local communication areas of the communication networks that share the at least one shared local communication area, said neighboring local communication areas neighboring the at least one shared local communication area, wherein an information element indicating radio frequency channels used by neighboring local communication areas usable for the common system information is a list indicating absolute radio frequency channel numbers, wherein a general identification element of a communication network usable for one of the common and dedicated information is a public land mobile network identification, wherein a common general identification element of a communication network usable for the common information is a common public land mobile network identification, wherein a network identification element usable for the common information is a network color code, and wherein a permission indication usable for one of the common and dedicated information is a network color code permitted information element.

9. An apparatus comprising:

at least one processor, the at least one processor comprising:

a system information receiving device configured to receive system information, the system information comprising a set of common system information which applies to communication networks sharing at least one shared local communication area for communicating between the apparatus and host network elements, and a set of dedicated system information which applies to at least one of the communication networks sharing the at least one shared local communication area for communicating between the apparatus and host network elements, wherein the set of dedicated system information is addressed only to host network elements configured to support sharing of a local communication area, wherein the set of common system information comprises an information element indicating radio frequency channels used by neighboring local communication areas of the communication networks that share the at least one shared local communication area, said neighboring local communication areas neighboring the at least one shared local communication area, and a system information processing device configured to process the set of common system information and the set of dedicated system information received by the system information receiving device for one of a reselection procedure, a local communication area measurement procedure and a local communication area measurement and reporting procedure conducted by a host network element, wherein an information element indicating radio frequency channels used by neighboring local communication areas usable for the common system information is a list indicating absolute radio frequency channel numbers, wherein a general identification element of a communication network usable for one of the common and dedicated information is a public land mobile network identification, wherein a common general identification element of a communication network usable for the common information is a common public land mobile network identification, wherein a network identification element usable for the common information is a network color code, and wherein a permission indication usable for one of the common and dedicated information is a network color code permitted information element.

10. The apparatus according to claim 9, wherein the set of common system information further comprises a common general identification element of a communication network controlling the shared local communication area.

11. The apparatus according to claim 9, wherein the set of dedicated system information comprises a general identification element for each of the communication networks sharing the shared local communication area.

12. The apparatus according to claim 9, wherein the set of common system information further comprises a network identification element usable for distinguishing communication networks, wherein the network identification element is set such that the network identification element for a communication network controlling the shared local communication area used in the shared local communication area is different from the network identification element for the communication network controlling the shared local communication area used in a non-shared local communication area being a neighboring local communication area to the shared local communication area, and the network identification element for each communication network sharing the shared local communication area with the controlling communication network is different from each network identification element for the communication network controlling the shared local communication area, and, in case still other communication networks are sharing the shared local communication area, is different from the network identification element for the still other communication networks sharing the shared local communication area.

13. The apparatus according to claim 12, wherein the at least one processor further comprises:

a permission indication receiving and processing device configured to receive and process a permission indication element for determining on the basis of the network identification element of the respective communication network which neighboring local communication areas are allowed to be considered in the at least one of the reselection procedure, the local communication area measurement procedure and the local communication area measurement and reporting procedure conducted by the host network element.

14. The apparatus according to claim 13, wherein the permission indication receiving and processing device is configured to select the local communication areas on the basis of the permission indication element indicating at least one of a network identification element related to the general identification element of the communication network to which a specific host network element is registered, a network identification element related to a common general identification element of the of the communication network controlling the at least one shared local communication area, and an alternative network identification element related to a general identification element of the communication network to which a specific host network element is registered when the communication network controls the shared local communication area.

15. The apparatus according to claim 13, wherein the permission indication receiving and processing device is further configured to receive and process a dedicated permission indication element set for each communication network sharing the shared local communication area, wherein the dedicated permission indication element is processed only when the apparatus is implemented in a host network element being configured to support sharing of a local communication area.

16. The apparatus according to claim 13, wherein the permission indication receiving and processing device is configured to use the permission indication element for determining on the basis of the network identification element of the respective communication network which neighboring local communication areas are allowed to be considered for the reselection procedure when the host network element to which the apparatus is applied is in an idle state, and for the local communication area measurement procedure or the local communication area measurement and reporting procedure when the host network element to which the apparatus is applied is in one of a dual transfer mode and a packed transfer mode.

17. A method comprising:
receiving system information at a communication apparatus, the system information comprising a set of common system information which applies to communication networks sharing at least one shared local communication area for communicating between the communication apparatus and host network elements, and a set of dedicated system information which applies to at least one of the communication networks sharing the at least one shared local communication area for communicating between the communication apparatus and host network elements,
wherein the set of dedicated system information is addressed only to host network elements configured to support sharing of a local communication area,
wherein the set of common system information comprises an information element indicating radio frequency channels used by neighboring local communication areas of the communication networks that share the at least one shared local communication area, said neighboring local communication areas neighboring the at least one shared local communication area, and
processing, using a processor at the communication apparatus, the received set of common system information and the received set of dedicated system information for one of a reselection procedure, a local communication area measurement procedure and a local communication area measurement and reporting procedure conducted by a host network element,
wherein an information element indicating radio frequency channels used by neighboring local communication areas usable for the common system information is a list indicating absolute radio frequency channel numbers,
wherein a general identification element of a communication network usable for one of the common and dedicated information is a public land mobile network identification,
wherein a common general identification element of a communication network usable for the common information is a common public land mobile network identification,
wherein a network identification element usable for the common information is a network color code, and
wherein a permission indication usable for one of the common and dedicated information is a network color code permitted information element.

18. An apparatus comprising:
at least one processor, the at least one processor comprising:
a common system information preparation device configured to prepare a set of common system information which applies to local communication areas of a communication network sharing at least one shared local communication area with other communication networks for communicating between the apparatus and host network elements; and
a transmitting device configured to send from the apparatus to host network elements located in a non-shared local communication area that is a neighboring local communication area to a shared local communication area, system information comprising the set of common system information prepared by the common system information preparation device;
wherein the set of common system information comprises an information element indicating radio frequency channels used by the at least one shared local communication area and neighboring local communication areas of the communication network that share the at least one shared local communication area, said neighboring local communication areas neighboring the at least one shared local communication area; and
wherein the set of common system information further comprises a network identification element usable for distinguishing communication networks,
wherein the network identification element is set such that
the network identification element for the communication network controlling the shared local communication area used in the shared local communication area is different from the network identification element for the communication network controlling the shared local communication area used in a non-shared local communication area being the neighboring local communication area to the shared local communication area, and
the network identification element for each communication network sharing the shared local communication area with the controlling communication network is different from each network identification element for the communication network controlling the shared local communication area, and, in case still other communication networks are sharing the shared local communication area, is different from the network identification element for the still other communication networks sharing the shared local communication area,
wherein an information element indicating radio frequency channels used by neighboring local communication areas usable for the common system information is a list indicating absolute radio frequency channel numbers, a network identification element usable for the common information is a network color code, and a permission indication usable for one of the common information is a network color code permitted information element.

19. The apparatus according to claim 18, wherein the at least one processor further comprises:
a permission indication preparation device configured to prepare a permission indication element indicating on the basis of the network identification element of the respective communication network which neighboring local communication areas are allowed to be considered in at least one of a reselection procedure, a local communication area measurement procedure and a local communication area measurement and reporting procedure conducted by a host network element,
wherein the permission indication elements comprises an indication based on the network identification element used for the shared local communication area.

20. A method comprising:
preparing, using a processor, a set of common system information which applies to local communication areas of a communication network sharing at least one shared local communication area with other communication networks for communicating between a communication apparatus and host network elements; and
transmitting, using a transmitter of the communication apparatus, from the communication apparatus to host network elements located in a non-shared local communication area that is a neighboring local communication area to a shared local communication area, system information comprising the set of common system information;

wherein the set of common system information comprises an information element indicating radio frequency channels used by the at least one shared local communication area and neighboring local communication areas of the communication network that share the at least one shared local communication area, said neighboring local communication areas neighboring the at least one shared local communication area; and wherein the set of common system information further comprises a network identification element usable for distinguishing communication networks, wherein the network identification element is set such that the network identification element for the communication network controlling the shared local communication area used in the shared local communication area is different from the network identification element for the communication network controlling the shared local communication area used in a non-shared local communication area being the neighboring local communication area to the shared local communication area, and the network identification element for each communication network sharing the shared local communication area with the controlling communication network is different from each network identification element for the communication network controlling the shared local communication area, and, in case still other communication networks are sharing the shared local communication area, is different from the network identification element for the still other communication networks sharing the shared local communication area, wherein an information element indicating radio frequency channels used by neighboring local communication areas usable for the common system information is a list indicating absolute radio frequency channel numbers, a network identification element usable for the common information is a network color code, and a permission indication usable for one of the common information is a network color code permitted information element.

21. The method according to claim 20, comprising:

preparing, using a processor, a permission indication element indicating on the basis of the network identification element of the respective communication network which of the neighboring local communication areas are allowed to be considered in at least one of a reselection procedure, a local communication area measurement procedure and a local communication area measurement and reporting procedure conducted by a host network element, wherein the permission indication elements comprises an indication based on the network identification element used for the shared local communication area.

* * * * *